United States Patent [19]

Dingess

[11] Patent Number: 4,561,816
[45] Date of Patent: Dec. 31, 1985

[54] REMOTE MANIPULATOR ARM FOR NUCLEAR GENERATOR REPAIR

[76] Inventor: Billy E. Dingess, P.O. Box 357, Ferrellsburg, W. Va. 25513

[21] Appl. No.: 412,493

[22] Filed: Aug. 30, 1982

[51] Int. Cl.⁴ ............................................. B25J 3/00
[52] U.S. Cl. ...................................... 414/4; 414/590; 165/11.1; 901/22; 901/25; 901/41
[58] Field of Search ........................ 414/4, 5, 730, 735, 414/736, 590, 751, 749; 901/23-25, 9, 12, 41; 165/11.1

[56] References Cited

U.S. PATENT DOCUMENTS

| | | | |
|---|---|---|---|
| 3,987,498 | 10/1976 | Mason | 901/23 X |
| 4,030,309 | 6/1977 | Mason | 901/41 X |
| 4,200,424 | 4/1980 | Gerkey et al. | 414/744 R |
| 4,222,699 | 9/1980 | Dunn et al. | 901/41 X |
| 4,303,368 | 12/1981 | Dent et al. | 414/4 X |

Primary Examiner—Terrance L. Siemens
Attorney, Agent, or Firm—Gipple & Hale

[57] ABSTRACT

A remote manipulator arm for positioning and operating tube sheet repair tools within a nuclear generator shell. The arm includes a number of arm segments linked serially, each having a remotely-controlled motor to pivot an elbow in the arm segment by way of gears. A mounting bracket passes through a manhole in the generator shell and provides a stable point of connection for the arm, both inside and outside the shell, as well as connections for power and control signals to the arm. A workhead is provided for mounting on the arm end opposite the bracket, and can carry a plurality of tools to conduct repair operations on tubes. The mounting bracket can be installed from without the shell and does not block the manhole, and the arm is self-installing, requiring no human presence within the generator shell.

18 Claims, 18 Drawing Figures

REMOTE MANIPULATOR ARM FOR NUCLEAR GENERATOR REPAIR

BACKGROUND OF THE INVENTION

This invention relates to remote manipulators and, more particularly, to remote manipulators for inspecting and repairing nuclear boiler generators.

A typical nuclear boiler generator comprises a nuclear reactor core surrounded by a vertically oriented cylindrical shell, with hemispherical caps at each end of the cylindrical shell. In order to collect heat generated by the nuclear core, a fluid is circulated through a large number of vertical tubes interspersed through the core. Each tube carries fluid up from the lower hemisphere through the core, then arches above the core to carry the fluid back down through the core then arches above the core to carry the fluid back down through the core to the lower hemisphere. The tubes begin and end at a horizontal surface referred to as a "tube sheet", which forms the ceiling of the lower hemisphere.

Due to the nature of nuclear reactor operation, the circulating fluid becomes radioactive. A secondary fluid, known as "feedwater", is circulated around the exterior of the tubes above the reactor core, in order to transfer heat from the circulation fluid to the feedwater. The non-radioactive feedwater is then used to drive a generating turbine. Occasional leaks from the circulating tubes allow radioactive fluid to mix with feedwater, however, which requires the repair of the leaking tube in order to minimize the release of radioactivity to the exterior environment. Typically, because the number of tubes intersperced in the core exceeds the number needed to efficiently transfer heat, repair is effected by sealing both ends of the leaking tube at the tube sheet, so that fluid no longer circulates therethrough.

In order to seal both ends of the tube at the tube sheet, manholes are provided in the lower hemisphere for access to the tube sheet. However, the interior of the hemisphere maintains high residual radioactivity even when drained of fluid, which limits the amount of time an individual may be allowed to spend with the hemisphere. In a typical welding operation to plug a single tube, which may take several hours to complete by hand, a worker is allowed to spend no more than a few minutes inside the hemisphere, and must immediately thereafter discard a protective suit costing many hundreds of dollars. Accordingly, it would be advantageous to perform operations on the tube terminii within the hemisphere without requiring the presence of working personnel.

There are several types of mechanisms known in the prior art that attempt to provide a solution to this problem, but all of these devices exhibit difficulties which limit their usefulness. One type of device is the walking platform. This device provides a horizontal platform bearing various tools and inspection systems, held against the tube sheet by fingers which extend into tube ends. The fingers provide horizontal stability and, in some instances, vertical support as well. Typically, the mechanisms allow withdrawal of a finger and a translation thereof across the tube sheet to a remote tube and, followed by securing the finger in the remote tube end, withdrawal, translation and replacement of subsequent fingers, followed finally by translation of the horizontal platform. Platform systems are, of course, limited as to their ultimate weight by the strength of the tube sheet and tube ends to resist vertical and horizontal motion of the inserted fingers. This problem is particularly acute when fingers are translated to a remote tube end, at which point the leverage on the tube end from the distant platform is greatest. Such platform systems are exemplified by U.S. Pat. No. 3,913,452; 3,913,752; 4,004,698; 4,018,344; 4,018,345; 4,018,346; 4,070,561; 4,074,814; and 4,193,735. These systems additionally exhibit an inability to repair tube ends adjacent a vertical barrier within the hemisphere, such as the hemisphere itself or a central tube sheet support column.

A second type of system, exemplified by U.S Pat. No. 3,934,731, is a moveable crane type apparatus with the main horizontal travel beam attached to various tube ends for horizontal and vertical support. This device, likewise, offers the possibility of damage to the tube ends supporting the travel beam, due to leverage on the travel beam caused by the crane extended therefrom. Moreover, tube ends covered by the travel beam cannot be sealed.

A third type of system provides a vertical support column between the tube sheet and the bottom of the hemisphere, upon which is supported a swinging boom carrying the work platform. In some cases, the vertical column has been supported by connection to the central tube sheet support column rather than the tube sheet itself, or may be clamped to the manhole rim rather than resting on the bottom most point of the hemisphere. These systems are typically much bulkier than the platform systems and inhibit access of personnel to the hemisphere interior during operation or installation for troubleshooting purposes. Moreover, they exhibit an inability to reach tube ends adjacent the top of the vertical column. Also, repair operations which require the use of force, such as milling, tax the stability of the swinging horizontal boom. Such systems are typified by U.S. Pat. No. 4,192,053; 4,200,424; 4,205,939; 4,205,940; 4,212,583; and 4,222,699.

U.S. Pat. No. 4,173,060 discloses a horizontal swinging boom mounted on a telescoping diagonal support which extends into the hemisphere from a stationary mounting outside the manhole. This system limits the mass of the work platform on the boom in order to minimize the leverage force exerted on the telescoping support, and completely blocks access through the manhole.

U.S. Pat. No. 4,158,415 and 4,303,368 disclose a remote segmented arm for installation of repair tools adjacent a tubesheet. The arm is coupled to a base 66 at horizontal sliding joint 72. the arm is incapable of remote installation. The arm does not support the tool head against the tubesheet, but merely transports it there, where it is locked to tubes for support. In the '368 patent, the arm delivers the tool head to a traversing mechanism which requires initial placement against the tubesheet by hand. Neither power nor control signals are delivered through the arm, which disconnects from the tool head prior to performance of work. Thus, the arm is able only to remove the tool head to change tools outside the manhole, and cannot carry multiple tools or relocate the tool head to a separate location.

SUMMARY OF THE INVENTION

Herein is disclosed a remote manipulator arm for conducting tube sheet repairs inside a nuclear generator shell. The arm comprises a plurality of arm segments serially linked, attached at one end to a fixed mounting bracket and at the other to a workhead bearing a plurality of repair tools. Each arm segment includes a motor and an elbow, the motor being remotely controlled to pivot the elbow by way of planetary gearing, with a linkage on each end of the arm for coupling to other arm segments, the bracket or the workhead.

The mounting bracket may be installed through a manhole from without the shell of the generator, and includes arm linkages both within and without the shell. The arm may initially be linked to the outer bracket linkage and then be manipulated to link itself to the inner bracket linkage by passing through the manhole. This advantageously avoids the necessity for human presence within the shell. However, the bracket does not block the manhole during use of the arm, so that troubleshooters may enter the shell if the arm malfunctions.

A workhead is also provided with a plurality of repair tools which may be selected for engagement with a tube to be repaired. The workhead may be manipulated to select and then position each tool precisely against the targeted tube. The arm may be manipulated to place the workhead through the manhole in order to restock supplies, change tools or replace the workhead with other devices such as a claw or television camera.

These and other objects and advantages of the present invention may be more clearly understood by reference to the following detailed description thereof, when read in conjunction with the accompanying drawings.

DETAILED DESCRIPTION OF THE DRAWINGS

Figure 1:
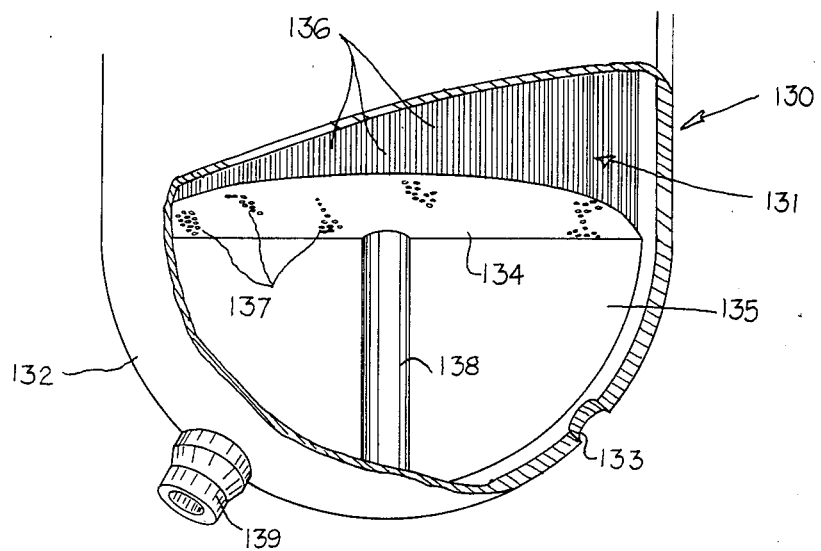
FIG. 1 is an isolated perspective view of a nuclear generator shell, partially cutaway to illustrate the interior tube sheet.

As shown in FIG. 1, a typical nuclear boiler generator 130, such as those constructed by Westinghouse Electric Company or Combustion Engineering, Inc. comprises a space 131 through which a plurality of U-shaped coolant tubes 136 pass. The tubes 136 begin and end at a tube sheet 134 beneath the space 131. The tube sheet 134 forms the ceiling of a space defined by a hemispheric shell 132. The tube sheet 134 is separated into two halves, as is the hemispheric shell 132, by partition 135, and the tube sheet is supported by support column 138. Each tube 136 has a terminus 137 in the tube sheet 134 on one side of partition 135, and a second terminus 137 in tube sheet 135 of the opposite side of partition 135. Thus, a pumping system (not shown) may force coolant through a port 139 defined in the hemispheric shell 132 for circulation through tubes 136, with the water being withdrawn through a port 139 on the opposite side of partition 135 to supply the pump for recirculation. At least one manhole 133 is defined in hemispheric shell 132 on each side of partition 135, and is typically of sixteen inch diameter.

The best mode and preferred embodiment of the present invention is shown in FIGS. 2 through 5 and comprises a remote manipulator arm generally indicated at 20. The arm 20 comprises a plurality of arm segments 40, each of which comprises a housing 44 of generally rectangular cross-section with diagonal measure less than the diameter of manhole 133, a pivotable elbow 46 in each housing 44, and a segment linkage 41 terminating each housing 44 to provide connection to the next segment 40.

Figure 13:
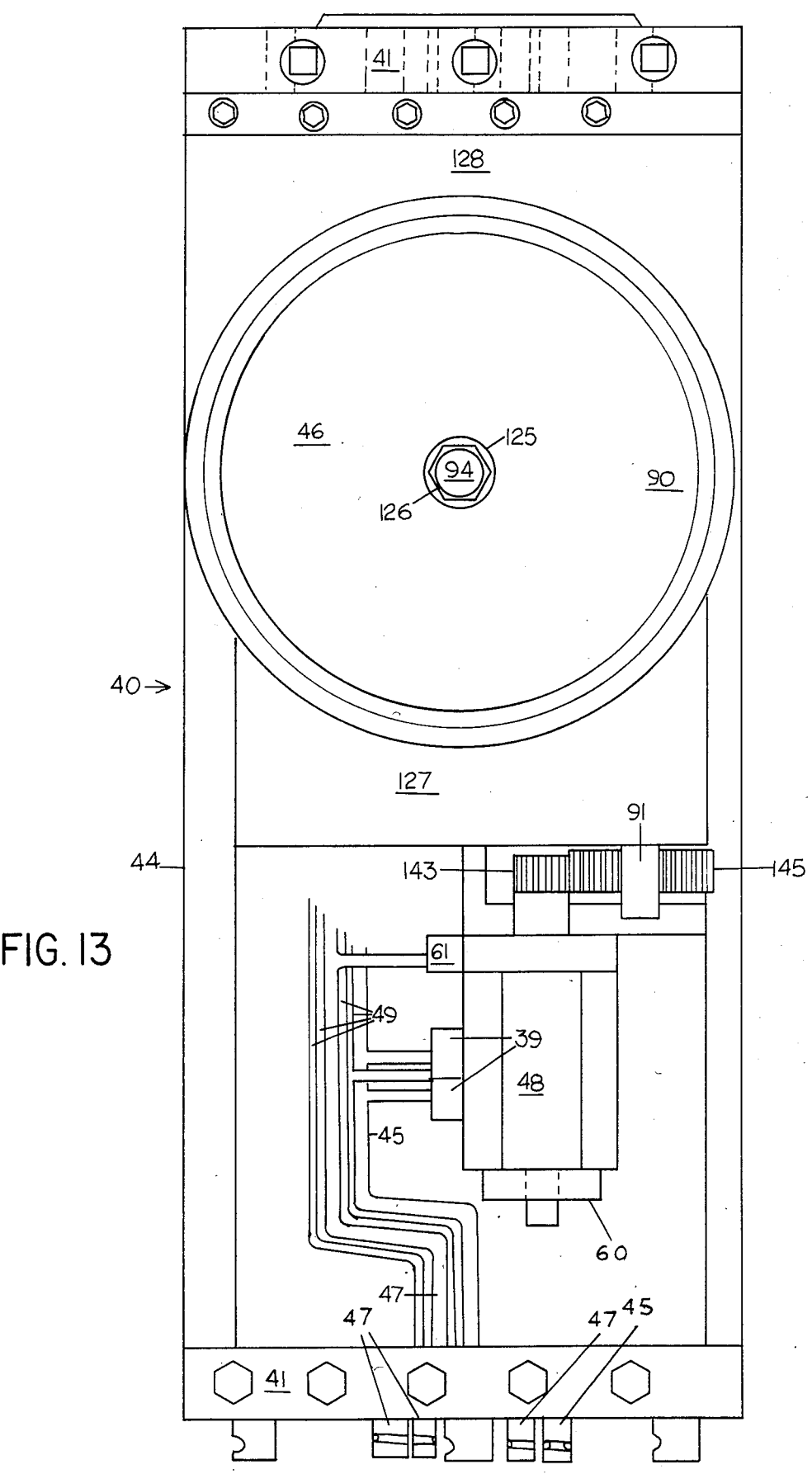
FIG. 13 is an isolated view of a portion of the apparatus of FIG. 2, showing an arm segment, partially cutaway to show placement of the motor thereof.
Figure 16:
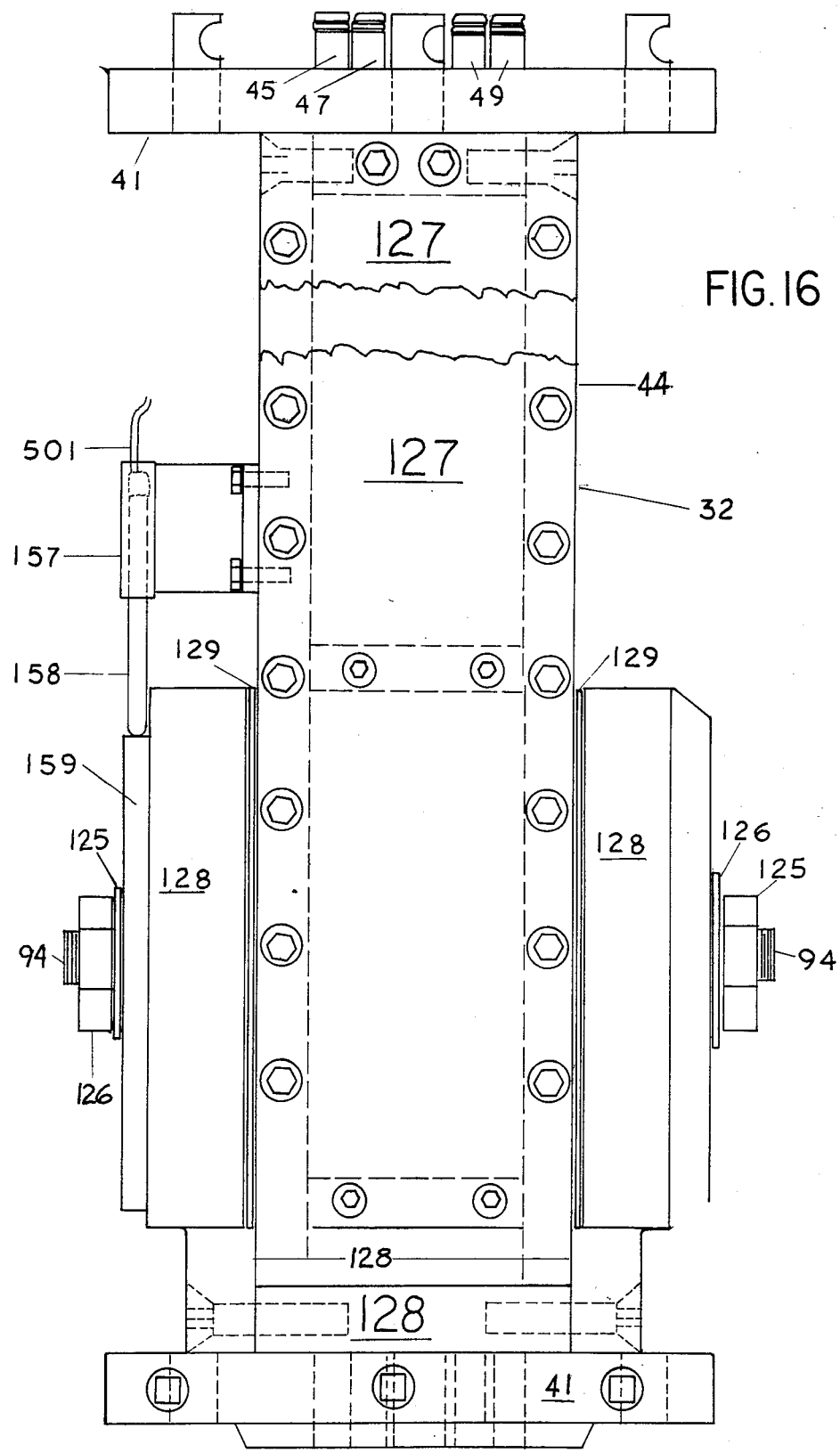
FIG. 16 is a side view of the arm segment of FIG. 13.

Turning to FIGS. 13 and 16, an arm segment 40 is illustrated in detail. Housing 44 comprises a motor housing 127 pivotably linked to outer housing 128, which pivots on main axle 94 driven by motor 48 in housing 127 through elbow gearing 90. The end of housing 127 opposite elbow 46 bears a segment linkage 41 which may be either a male or a female camlock linkage, as does the end of housing 128 opposite elbow 46. Linkage 41 is preferably an eight pin D-1 camlock which is a well-known conventional linkage. Each housing 44 bears one male camlock and one female camlock, which may be placed on either end of the housing 44 although, of course, for purposes of assembling arm 32 it is useful to establish uniform placement conventions.

Any number of segments may be assembled to comprise the arm 20. The number shown in for purposes of illustration only.

Returning to FIGS. 2 through 5, a manhole bracket 30 is advantageously installed through manhole 133 to provide a fixed base for arm 32 against the interior of hemispheric shell 32. The bracket 30 includes bracket plate 63, which may define bolt sockets for attachment of the bracket 30 with bolts placed therethrough and into threaded sockets defined around manhole 133. Alternatively, the bracket may be secured to shell 132 by magnetic or other well-known conventional means.

A bracket camlock 64 is mounted on plate 63 below manhole 133. A brace 66 coupled to plate 63 extends below the manhole 133 and the camlock 64. An assistance cylinder 68 is pivotably secured to brace 66 with cylinder rod 69 of cylinder 68 attached to an endmost arm segment 36 by way of detachable rod mount 67. Arm segment 36 need not have a drive motor or gearing to drive its elbow 46, because cylinder 68 gives sufficient power to deliver the arm 32 through the manhole 133.

Figure 11:
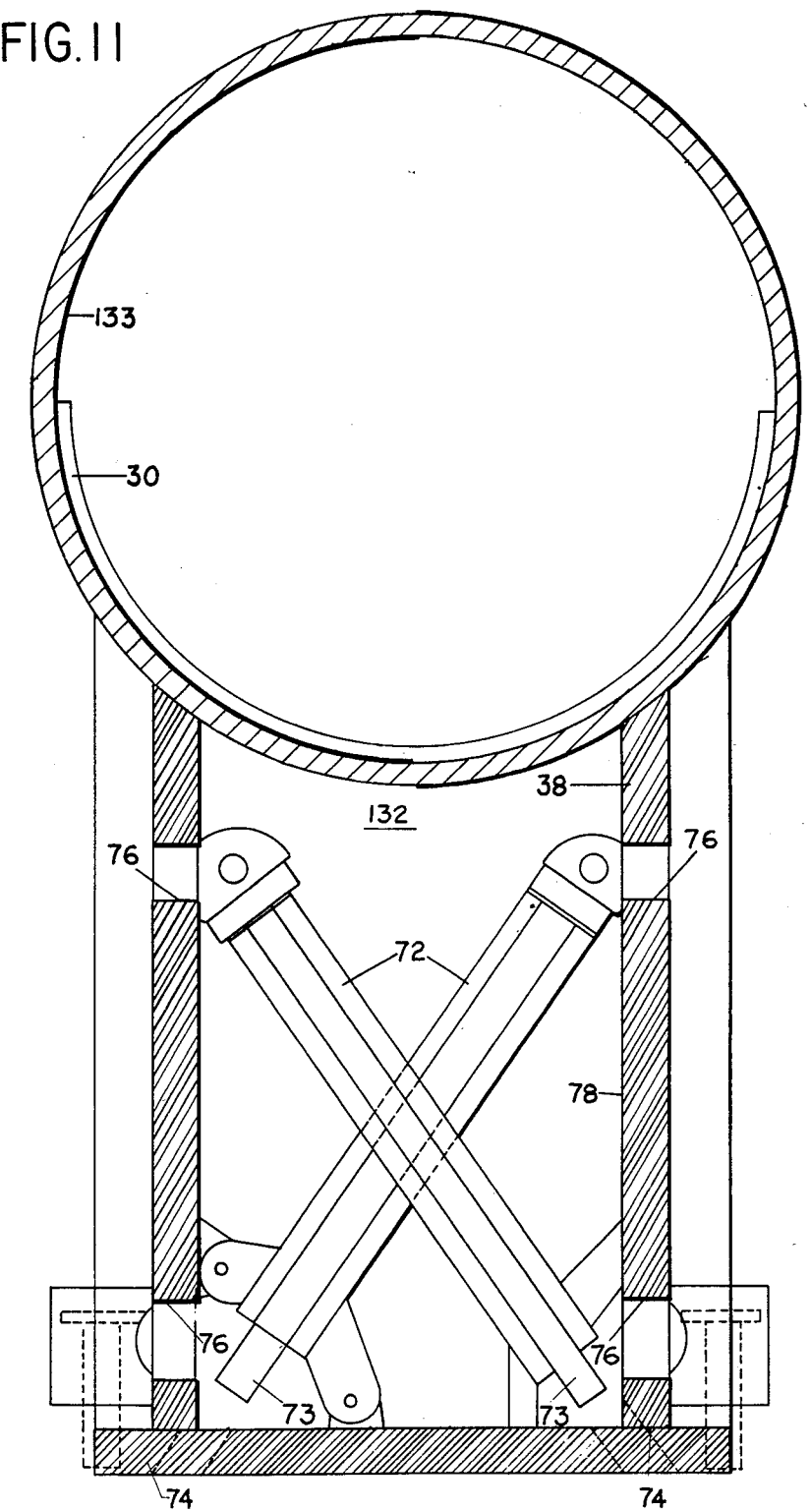
FIG. 11 is a back view of a portion of the apparatus of FIG. 2, showing the interior portion of the bracket with telescoping jacks.

Bracket 30 extends through manhole 133 around a portion of the rim thereof, typically around 50% of the rim and inward about 1 inch, so as to leave sufficient room for entry of the arm 32 or a workman into the hemispheric shell 132. The portion 38 of bracket 30 rests on the inside of the shell 132 and defines a vertical arm mounting socket 78 with a plurality of mounting pin holes 76 surrounding the socket 78. As shown in FIG. 11, recessed within bracket 30 from socket 78 are a pair of jacks 72, which may be driven by hydraulic lines extending through manhole 133 to force rods 73 through rod holes 74 to contact the interior of shell 132 and establish a wider base of contact thereon. An arm bracket segment 50 may be attached at the end of arm 32 opposite camlock 64 adapted to link with socket 78. Segment 50 carries motor 52 which may pivot elbow 57 of segment 50 about vertical axle 58, as well as an elbow 46 and motor 48 therefore.

Figure 3:
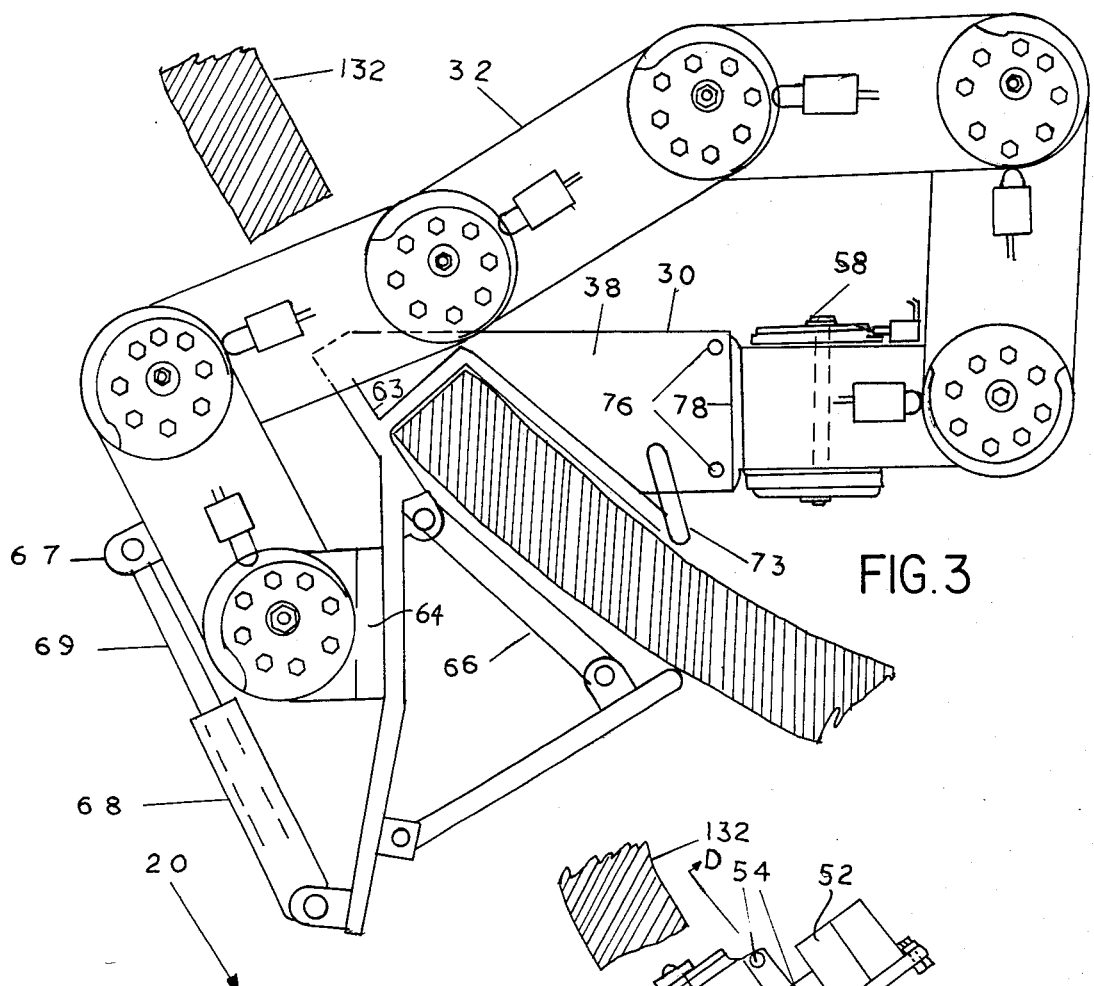
FIG. 3 is a side view of the apparatus of FIG. 2 completing installation inside the nuclear generator shell.
Figure 2:
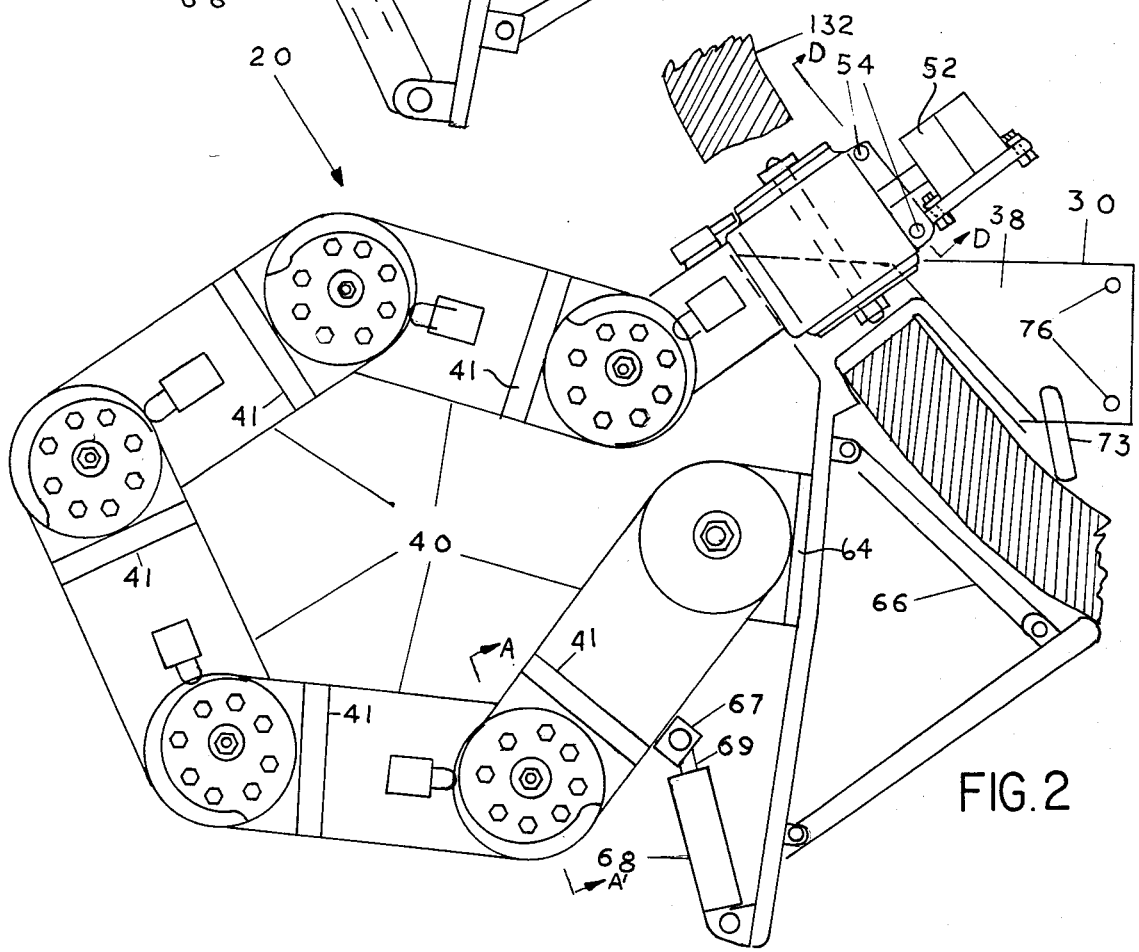
FIG. 2 is a side view of the present inventive apparatus showing the arm beginning installation through a manhole of the nuclear generator shell.
Figure 12:
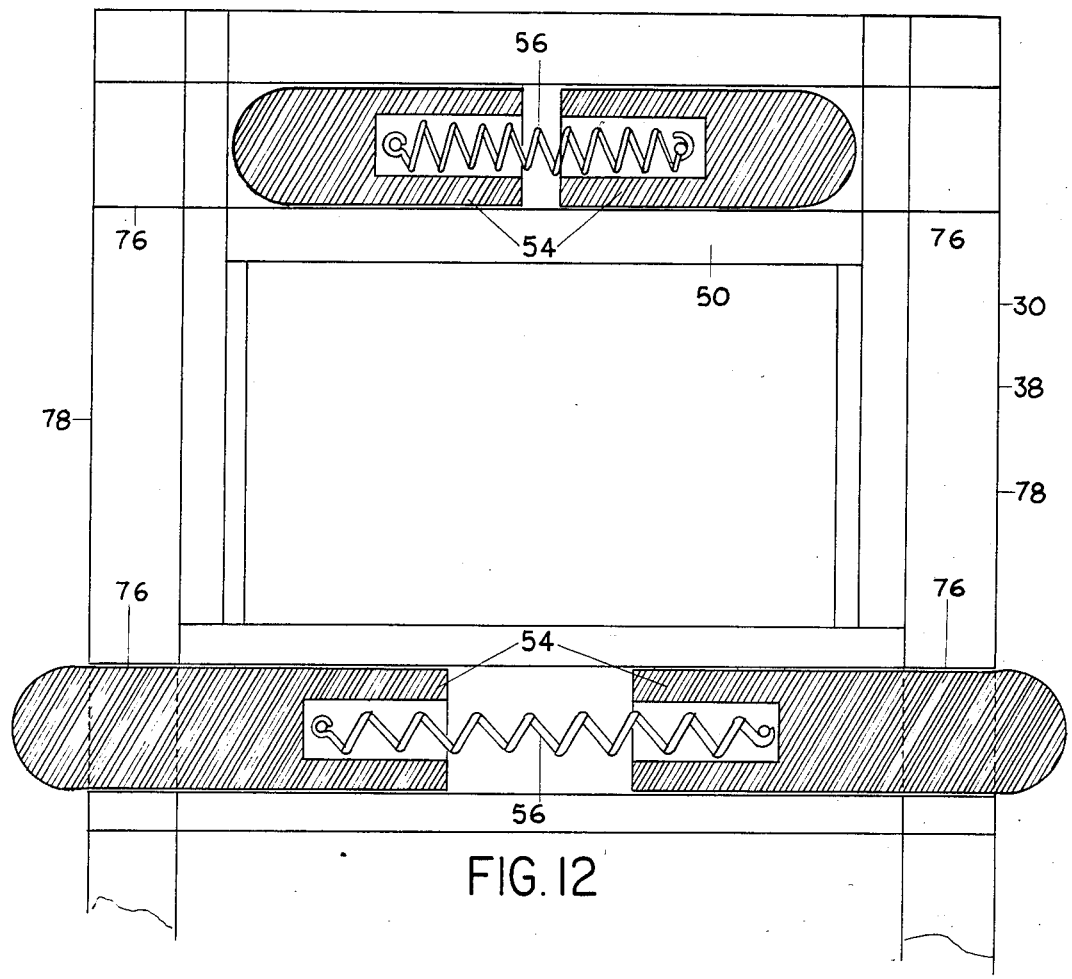
FIG. 12 is a cross-sectional view of the apparatus of FIG. 2 taken along line D-D' thereof, showing the bracket pins of the arm.

To install the arm 32 within shell 132, the bracket 30 is installed through a manhole 133, which may be accomplished by hand, and an end of arm 32 is then locked to camlock 64 on bracket 30. Alternatively, the bracket 30 may be a permanent part of newly-constructed hemispheric shells. As is shown in FIGS. 2 and 3, the opposite end of arm 32, carrying segment 50, is then directed to extend inward through manhole 133 and downward to insert motor 52 through socket 78. During this manipulation of the arm 32, cylinder 68 may be activated to assist the motion of arm 32. As best seen in FIG. 12, a plurality of pins 54 in segment 50 are aligned to extend through holes 76 defined in bracket 30. These pins are preferably driven inward by springs 56 placed therebetween, and driven outward by hydraulic pressure. The pins are extended outward after the segment 50 enters socket 78 in order to engage holes 76 and lock the arm into place. When this is accomplished, arm segment 36 may be detached from arm 32, and a workhead segment 37 and workhead 100 are attached to the arm 32. The arm may then be directed to withdraw entirely inside shell 132 as illustrated in FIG. 4.

Figure 4:
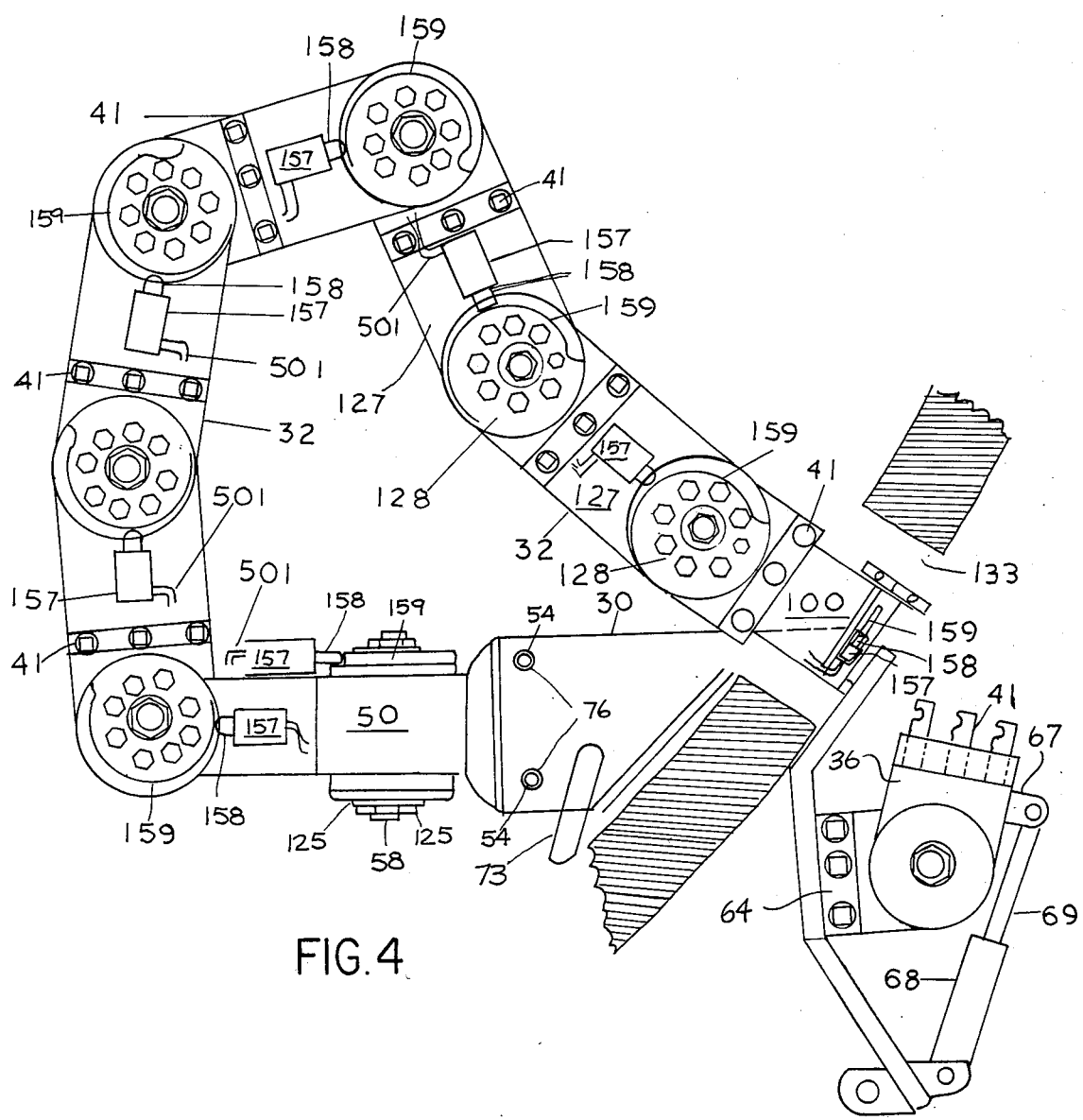
FIG. 4 is a side view of the apparatus of FIG. 2 including a workhead within the nuclear generator shell.

It will be appreciated that the arm segments may be assembled to form arm 32 as illustrated in FIGS. 2 through 4 with the elbow of each arm segment 40 pivoting on a parallel horizontal axis or, for special purposes, one or more arm segments may be rotated through a 90 degree angle prior to camlock linkage in order to provide perpendicular axles in addition to axle 58 at the base of the installed arm. For this purpose, it is preferable to utilize camlocks having eight pins, thus allowing linkage when rotated through 90, 180, or 270 degrees.

Returning to FIGS. 13 and 16, the power and control signals may be passed through camlock 64, bracket 30, socket 78, segment 50 and each arm segment 40 to each motor 48 and 52 and brake 60 by means of a pressurized air line 45, a pressurized hydraulic line 47 and electric lines 49. The brakes 60 may be any well-known conventional static electric brakes. The fluid couplings at camlock 64 and socket 78 are preferable self-sealing by any well-known conventional means when released in order to prevent pressure loss during insertion or removal of arm 32. As discussed in detail below, these lines will easily pass through the gear space in elbow 46 and, as is well known in the art, can be sufficiently flexible to accommodate motion of elbow 36 throughout its range of action. Motors 48 can be air motors supplied in common from air line 45 through any well-known four-way valves, regulators or limiters 39, all of which readily fit within housing 127 adjacent motor 48. The air exhausted from each motor 48 would preferably be released into the interior of hemispheric shell 132. Each valve controlling a motor 48 or brake 60 could be controlled remotely by direct connection to a unique electric line 49. Alternatively, a single common electric line could be passed through all arm segments 40 and be used to supply electric power thereto, as well as amplitude-modulated carrier-current control signals to be decoded by receivers also housed in each housing 127 and adapted to operate electric valves. This communications and control system is also well known in the art and therefore is not illustrated in the drawings. A cam 159 may be mounted on housing 128 over elbow 46, to engage an end of piston 158 extending from cylinder 157 mounted to housing 127. As described in detail below, this allows precise determination of the angle between housing 127 and 128.

As is well known in the art, and therefore not illustrated in detail, each camlock 41 defines a disc structure from which extend a plurality of camlock linkage pins. As noted above, it is advantageous to select a camlock utilizing eight pins for use with the present invention. The central area of each disc, however, is free of linkage pins and the center of the male camlock surface will directly abut the center of the female camlock surface. Thus, self-sealing couplings of any well-known conventional type for air line 45, hydraulic line 47 and electric lines 49 may readily be incorporated into each camlock. For purpose of accommodating rotation of the camlock linkage to provide perpendicular elbow axles as described above, it would be advantageous to provide camlock center couplings for air line 45, hydraulic line 47 and electric lines 49 arranged concentrically or in parallel at 90 degree intervals around the center of camlock male 42 and camlock female 43.

Figure 7:
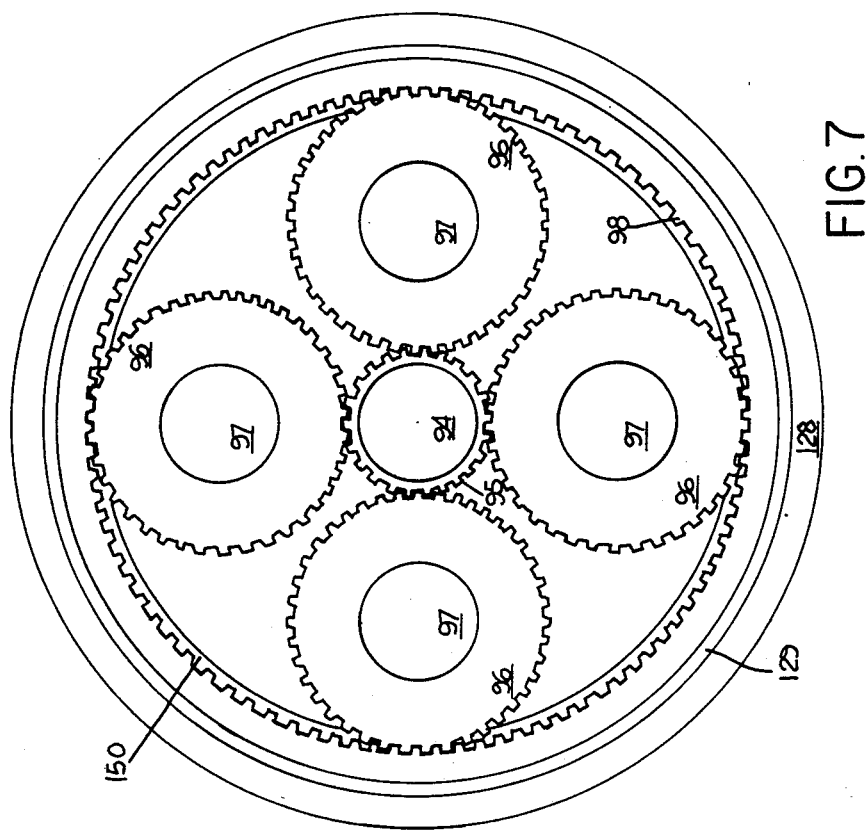
FIG. 7 is a cross-sectional view of the apparatus of FIG. 6 taken on line B-B' thereof, showing arrangement of the drive gears.
Figure 6:
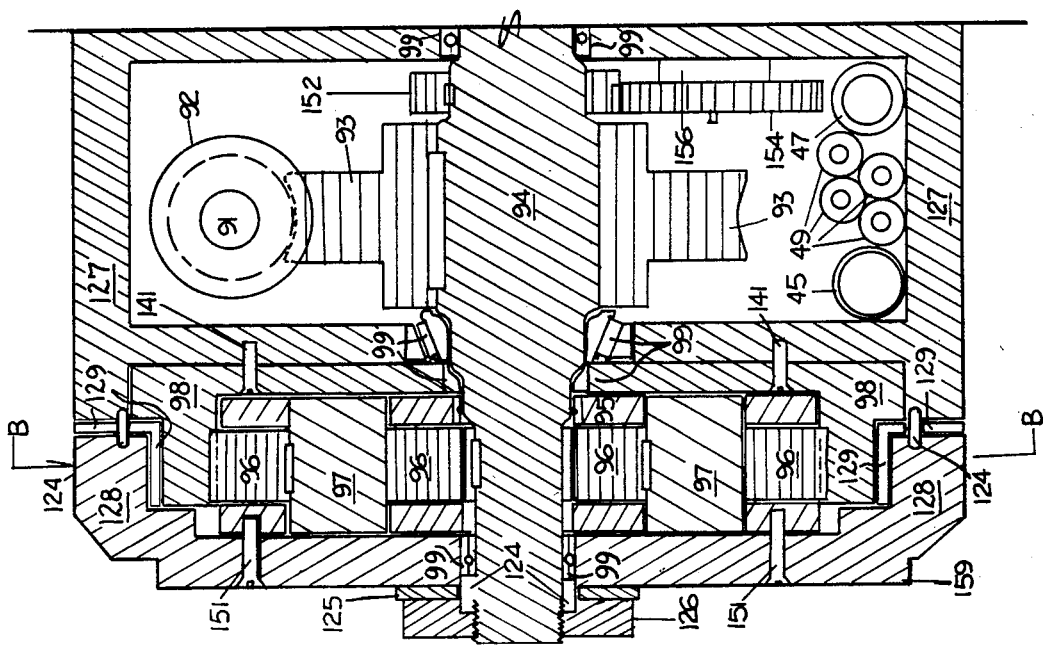
FIG. 6 is a cross-sectional view of the apparatus of FIG. 2 taken on line A-A' thereof, showing the elbow gear structure.

Turning now to FIGS. 6 and 7, an exemplary gear structure for operation of each elbow 46 is illustrated. Torque is transferred from motor 48 in motor housing 127 on worm 91 to worm gear 92, which drives transfer gear 93 machined on free-floating axle 94. Sun gear 95 is machined on axle 94, and is surrounded by a plurality of planetary gears 96 are pressed to needle bearings 97. Each roller bearing 97 is journaled to planetary housing 150 which pivots with respect to motor housing 127. Outer housing 128 is locked to planetary housing 150 by screws 151 and is forced to pivot about axle 94 as housing 150 orbits sun gear 95 when axle 94 is driven. Surrounding planetary gears 96 and housing 150 is ring gear 98 fixed by screws 141 to housing 127. A plurality of thrust bearings 129 are placed between housing 127 and 128 to assist pivoting. A plurality of bearings 99 in housing 127 and 128 and ring gear 98 allow axle 94 to rotate freely. The ends of axle 94 extend through the surfaces of housing 128 and are threaded to accept axle nuts 126 which sandwich axle thrust washers 125 against the outer surfaces of housing 128. The space within housings 127 and 128 in which elbow gearing 90 resides should normally be filled with oil, and therefore sealed with O-rings 124 placed between housing 128 and axle nutgs 126, and between housing 128 and housing 127. Housing 128 is preferably cut to allow rotation through an arc of 200 degrees.

Although only one side of housing 128 is illustrated in FIG. 6, it will be understood that the side not shown is a mirror image of the side illustrated, and operates in identical fashion.

An the axle 91 is turned by motor 48, each bearing 97 orbits around axle 94, carrying housings 150 and 128 in an arc centered on axle 94 with respect to housing 127. The number of planetary gears 96, and the gear ratio illustrated, may be varied to satisfy the particular torque and speed requirements of individual applications. It should be noted that the worm gear 92 and transfer gear 93 may be sized to permit passage of air lines, hydraulic lines and control lines from housing 127 to housing 128 through the space housing 127 beneath gear 93.

A typical motor used in this arrangement is available from Dayton Speedair. This motor has a length of 6 9/16th inches, width of 4 5/16th inches, and a height of 3 3/16th inches, and is a rotary vane type air motor supplying 114 inch-pounds of torque at 300 rpm when supplied with 200 pounds of air pressure. A reduction ratio of 3:1 between gears 143 and 145, 30:1 between gears 92 and 93 and a further reduction of 9:1 between axle 94 and orbiting bearings 97 and a further reduction of 9:1 between axle 94 and orbiting bearings 97 would provide, for instance, an output torque of 7695 foot-pounds at a rotation speed of 0.37 revolutions per minute. The ouput torque and rotation speed may, of course, be varied by adjustment of the gear ratios. The Dayton Speedair motor is rated for a maximum operating speed of 3000 rpm. However, it is preferable in this invention to limit the speed of each motor to a maximum of 2000 rpm, which can be accomplished in any well-known conventional manner such as a pressure limiter or orifice on the supply of air line 45.

An appropriate worm gear can be manufactured utilizing 8742 grade steel, heat treated, with a tensil strength of 140,000 to 150,000 pounds per square inch and a yield of 130,000. The gear may be rough machined or hot bed machined to 30,000th of an inch extra depth. Bronze can then be applied to the surface of the steel utilizing the mecto spray process to develop a good bearing surface, followed by remachining to achieve the proper depth.

Figure 8:
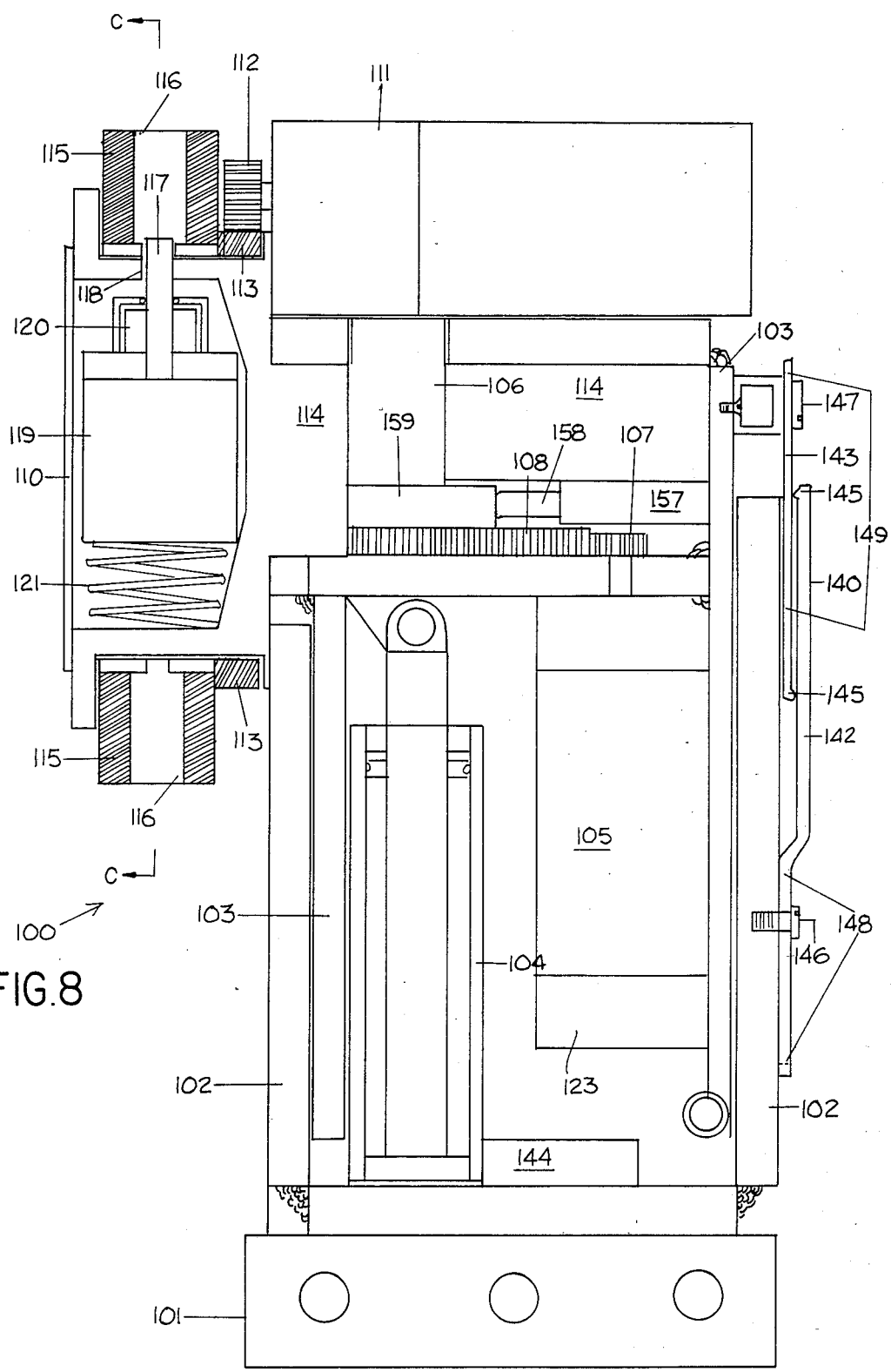
FIG. 8 is an isolated cutaway view of the workhead of FIG. 4.
Figure 9:
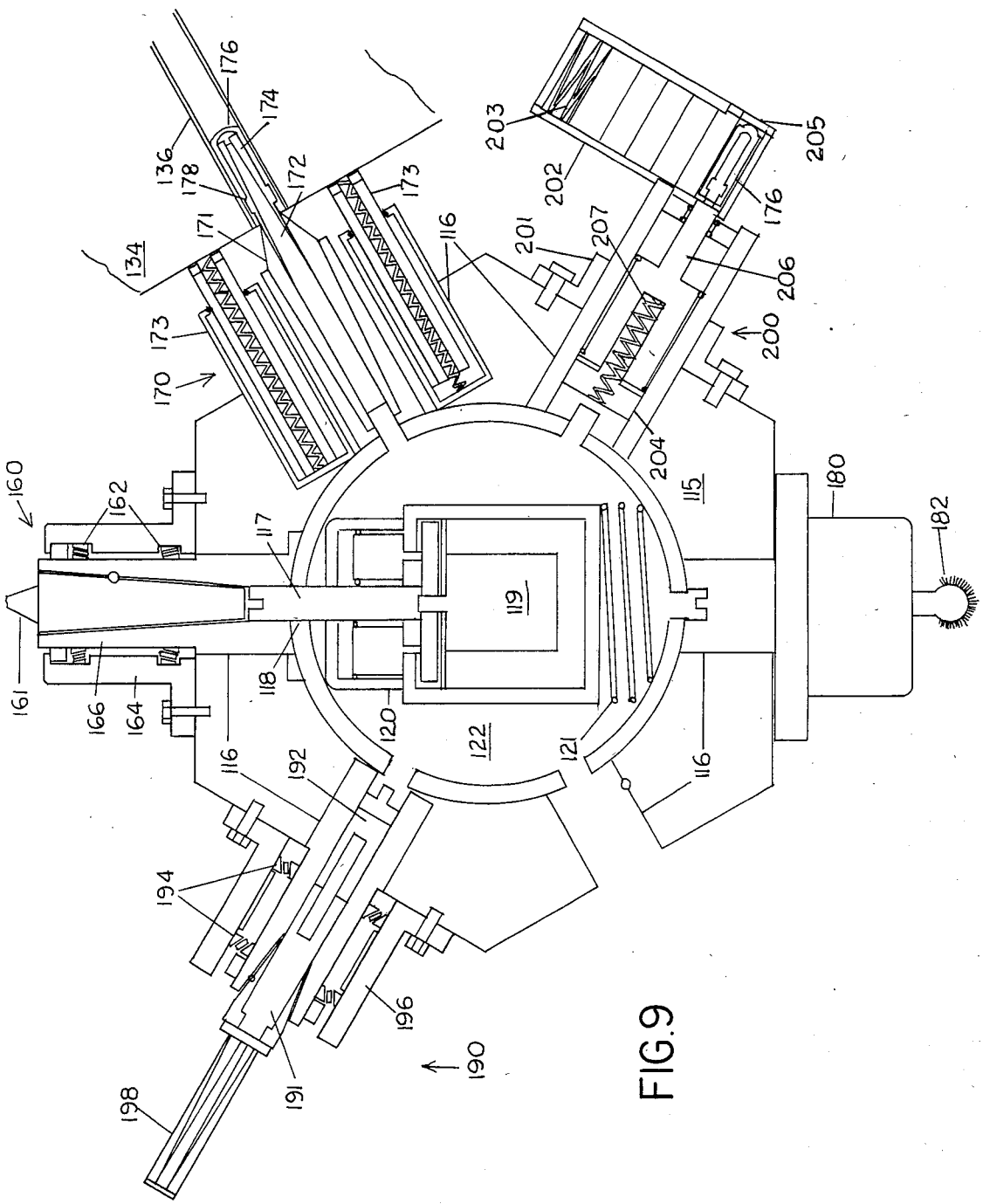
FIG. 9 is a cross-sectional view of the apparatus of FIG. 8 taken on line C-C' thereof, showing the tool turntable thereof.

Turning to FIGS. 8 and 9, a work head 100 is illustrated which may be linked through camlock 101 to segment 37 to conduct repair operations on tube sheet 134. Work head 100 comprises fixed housing 102 mounted to camlock 101, and telescope housing 103 slideably mounted against the interior of fixed housing 102 to allow vertical motion of telescope housing 103. A telescope jack 104 extends between the lower portion of housing 102 and an upper portion of housing 103, and may be operated to extend or retract housing 103. Jack 104 is preferably a hydraulic jack.

A turntable 110 comprising turntable base 114 and platter 115 rests atop housing 103. Swing motor 105 mounted within housing 103 drives motor gear 107 which engages semicircular axle gear 108 mounted on axle 106, which rotates base 114 on a vertical axis relative to housing 103. All electric lines 49, air line 45 and hydraulic line 47 extend into work head 100 and base 114 from camlock 101 in order to provide power and control for motor 119, motor 111, motor 105 and cylinder 104. A static electric brake 123 may be coupled to motor 105 to stop motor 105 when a tube requiring work is directly above turntable 110. A valve may be used to control the brake 123. If desired, an angle detection cylinder 157 may be mounted to housing 103 with rod 158 extending toward axle 106. A cam 159 mounted to axle 106 drives rod 158 inward to an extent depending on the angle of gear 108. Thus, the cylinder 157 may be coupled to a return hydraulic line 501 to report the angle at which gear 108 and axle 106 rest.

Turntable platter 115 is adapted to rotate on a horizontal axis around base 114, and is surrounded by ring gear 113 adjacent base 114. A platter motor 111 is mounted atop base 114, and drives platter motor gear 112 which meshes with ring gear 113 to rotate platter 115.

A plurality of tool turrets 116 extend from platter 115 in a plane perpendicular to the axis of rotation of platter 115. Thus, operation of motor 111 will rotate each turret 116 vertically into position together with any which may be mounted on each turret 116. An index drive area 122 is centrally defined in platter 15, and an index hole 118 is further defined from the back of each turret 116 through the periphery of platter 115 and the adjacent portion of base 114 to communicate with index area 122. Within index area 122 is located index motor 119, preferably a vane type motor, with a vertical axle. The motor 119 rests atop spring 121 which urges motor 119 upward. Index piston 120 is placed atop motor 119 and, when expanded, forces motor 119 downward, compressing spring 121. Index pin 117 extends from motor 119 through piston 120, and will extend further through hole 118 when piston 120 is contracted. When piston 120 is expanded, index pin 117 will withdraw from hole 118, thereby allowing turntable platter 115 to be rotated. Pin 117 is rotated by motor 119 when extended through hole 18 in order to provide torque to a tool mounted in turret 116 directly above motor 119.

A variety of automatic tools are useful for conducting repair processes on individual tubes 136 in tube sheet 134. Because these tools extend to varying distances from turrets 116, a plurality of adjustable limit switches 140 are provided, each corresponding to a specific tool, and each coupled to an appropriate control system for indicating the precise extent to which housing 103 must be telescoped from fixed housing 102 in order to properly engage a tool against a tube. Additionally, one limit switch 140 is set to indicate than the workhead is in a fully withdrawn or collapsed condition, so as to provide an initial position from which extension of housing 103 is begun. Each limit switch 140 may comprise an insulated switch contact 142 mounted to housing 102 and an insulated switch contact 143 mounted to housing 103. Contacts 142 and 143 are overlapped with uninsulted angular end portions 145 so that operation of telescope jack 104 will eventually cause contact of the ends 145, thereby signalling an appropriate control system (not shown) to halt extension of jack 104. The contacts 142 and 143 are held to their respective housing by screws 146 and 147, respectively, passing through contact slots 148 and 149 defined in contacts 142 and 143. In order to adjust the precise point of contact, either or both adjustment screws 146 and 147 may be loosened, and the contacts repositioned so that a different portion of the contact slots are held against the respective housing by the adjustment screws.

Should it become necessary to maintain the work head 100 in a vertical orientation during manipulation of the arm to carry the work head across tube sheet 132, a balance switch 144 may be provided in work head 100. The balance switch 144 is adapted in a well-known conventional manner to cause operation of an air motor 48 in an arm segment 40 coupled to work head 100 so as to retain the work head in vertical orientation.

In FIG. 9, a number of tools are illustrated mounted in turrets 116. In addition to index hole 118 through which index pin 117 may pass to provide torque to each tool mounted in a turret 116, any well-known conventional self-sealing linkages may be used to pass electrical signals and air and hydraulic pressure from turntable base 114 to any tool mounted in turret 116.

One such tool is spotface reamer 160. A reamer housing 164 is mounted to turntable 115, and a reamer spindle 166 is rotatably mounted within housing 164 on bearings 162. The spindle 166 may be engaged by pin 117 to rotate the reamer element 161 on spindle 166.

Reamer 160 is normally utilized first in the sequence of tools applied to a tube. Because small errors in horizontal alignment of reamer 160 and the tube may exist, motor housing 127 of arm segment 37 is telescopic in nature. Alignment errors are corrected by expansion or contraction of housing 127 in response to the horizontal forces experienced by the tapered body of reamer 160 as it moves upward into the tube. When upward movement is complete, housing 127 may be locked into position by any well-known conventional means so as to maintain alignment for subsequent tools.

Another appropriate tool is plug puller 170. A housing 171 is mounted to turret 116, and supports taper pin 172. Taper pin 172 extends beyond housing 171 and bears expandable collet 174. A pin drive piston 175 in housing 171 may be enabled to drive pin 172 forward when collet 174 is positioned within plug 176, thereby expanding collet 174 into circular groove 178 defined in plug 176. Thereafter, a plurality of hydraulic pistons 173 surrounding pin 172 and contacting tube sheet 134 are enabled to drive workhead 100 away from tube sheet 134. This causes plug 176 to be removed together with collet 174 and pin 172.

Another appropriate tool is wire brush 180. Wire brush head 182 is rotatably mounted in turret 16 for engagement with index pin 117 to be rotated within a tube 136.

Another appropriate tool is tube roller 190. A tube roller housing 196 is mounted to turret 116. A rotatable taper pin 191 is mounted on bearings 194 in housing 196. The end of taper pin 191 extends beyond housing 196 within expandable cylinder 198. A drive piston 192 may extend taper pin 191 in order to cause expansion of expandable cylinder 198 within a tube 136, and taper pin 191 and cylinder 198 may then be rotated by engagement of taper pin 191 with index pin 117.

Yet another appropriate tool is plug inserter 200. Plug inserter housing 201 is mounted to turret 116. Magazine 202 atop housing 201 contains a plurality of plugs 176 which are urged towards magazine egress 205 by magazine spring 203. An hydraulic piston 204 drives an insertation ram 206 through magazine 202 to force a plug 176 through egress 205. A return spring 207 withdraws ram 206 when piston 204 is deactivated. It may be desired to utilize air pressure to assist spring 207.

Figure 14:
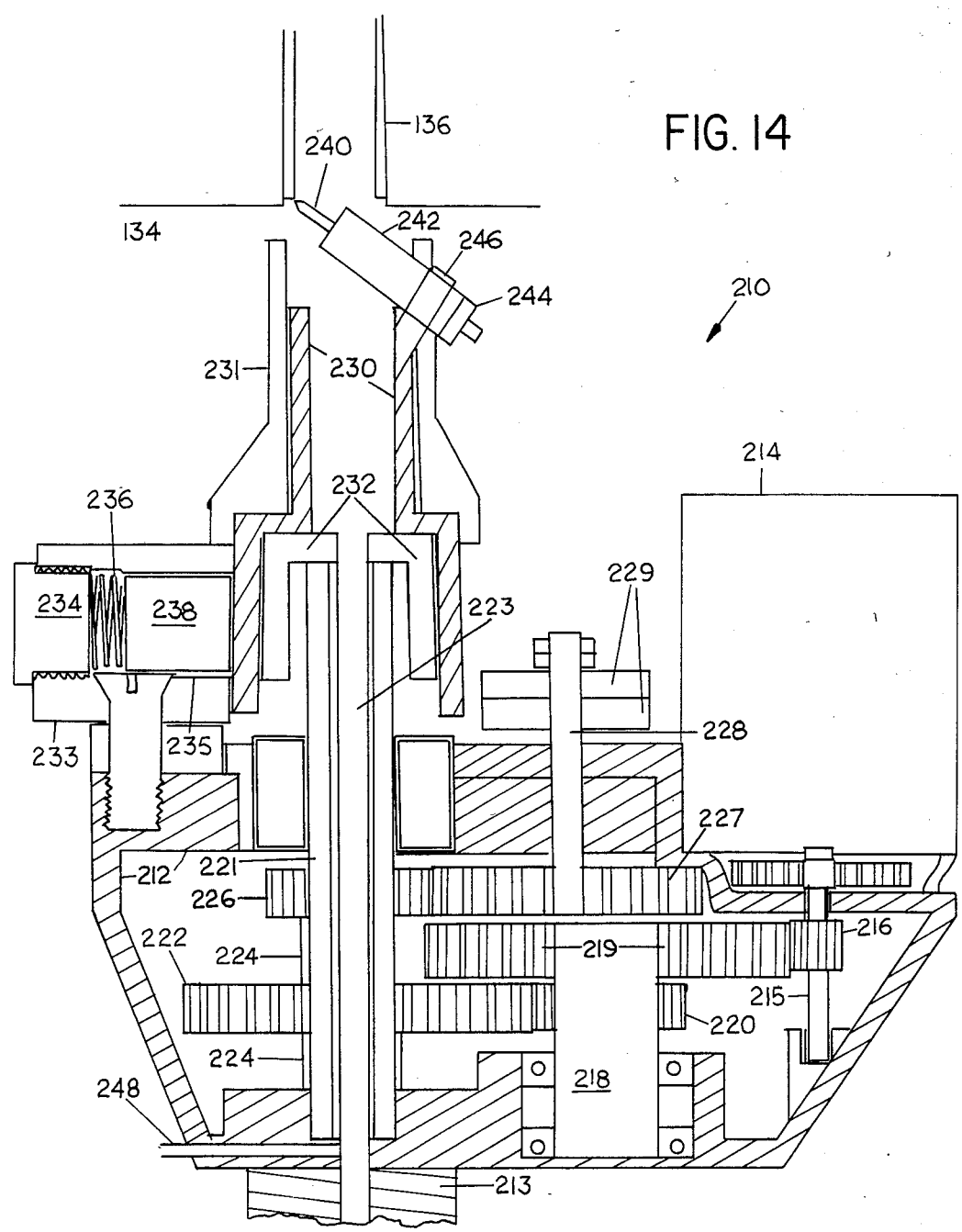
FIG. 14 is a cross-sectional view of a weldhead for use with the apparatus of FIG. 9.

Still another appropriate tool is weld head 210, illustrated in FIG. 14. A gear casing 212 for the weld head is secured to a turret 116 through turret plug 213, which may communicate electrical power from turntable 115 to gear motor 214 mounted on casing 212. Motor axle 215 of motor 214 extends within housing 212 and drives motor gear 216, which meshes with transfer gear 219 on transfer axle 218 journaled to casing 212. Reduction gear 220 on axle 218 meshes with drive gear 222 mounted to drive shaft 221. Drive shaft 221 is preferably hollow for purposes which will be detailed herein below.

Drive shaft 221 is journaled to casing 212, and reduction gear 226 mounted on axle 221 meshes with cam gear 227 on cam axle 228. An insulated drive shaft head 232 is mounted atop drive shaft 221, and supports contact tube 230 and outer insulator tube 231. Contact tube 230 is made of a conducting material such as cooper. Cams 229 are mounted on cam axle 228. Contact of cams 229 with contact points of any well-known conventional type such as automobile distributor points (not shown) mounted on casing 212 may be utilized to provide timing and sequencing information for the welding process through electrical lines 49 back to a remote operator.

A weld tip collet 242 is mounted on contact tube 230 by way of adjustable collet clamp 246. A weld tip 240 extends from collet 242, and the length of the tip may be adjusted by manipulation of adjustment nut 244. Although other welding systems may be equally useful, the Tungsten Inert Gas system is preferable, with weld tip 240 being made of tungsten and an inert gas such as argon being provided in the vicinity of the welding operation. This can be accomplished by feeding gas through the drive shaft bore 223 from gas line 248.

A brush housing 233 is mounted on casing 212 adjacent contact tube 230 below insulator tube 231. The brush housing 233 defines a brush bore 235 in which are located brush terminal 234, brush 238 and brush spring 236 therebetween. Brush terminal 234 is preferably placed in a threaded portion of bore 235 so that the force of contact of brush 238 against the revolving contact 230 may be adjusted by motion of terminal 234, thus altering the length of spring 236. A welding current supply line (not shown) may be coupled to terminal 234 for supplying electrical power through brush 238 and tube 230 to collect 242 and tip 240.

It should be noted that other tools may be mounted to and utilized in conjunction with turrets 116. For instance, if desired, a spool wire supply may be coupled to a turret 116 adjacent weld head 210 in order to supply wire through bore 223 to assist in the welding process. Many powered hand tools may be adapted easily to be mounted and operated in a turret 116. A horizontal offset device can also be mounted to a turret 116 to provide torque and a mounting socket displaced horizontally away from housing 103, for work on edge tubes adjacent a shell of relatively small diameter. Also, tools may be coupled directly to the end of arm 32 in place of workhead 100. For instance, a remotely operatable claw of any well-known conventional variety may be utilized on the end of arm 32 in order to manipulate objects within the generator such as observation lights, television cameras, or expandable dams for temporary sealing of port 139 to prevent loss of dropped materials.

Figure 15:
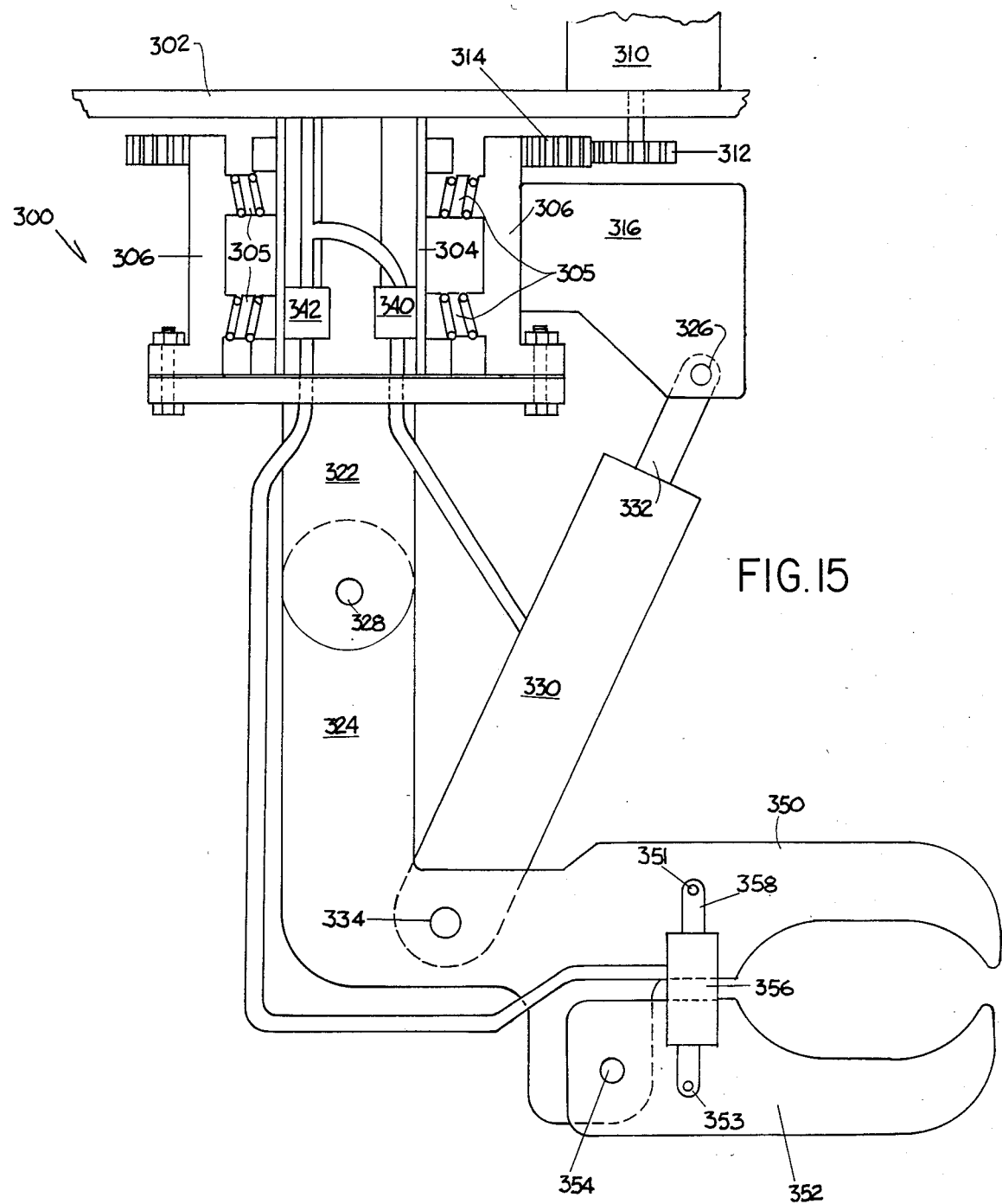
FIG. 15 is a partially cutaway front view of a manipulator claw adapted for use with the present invention.

FIG. 15 illustrates a manipulator claw 300 which may be attached to the end of arm 20 in place of segment 37. The claw 300 is coupled through camlock linkage 302 to the arm 20. A central shaft 304 is fixed to camlock linkage 302, and a base 306 revolves on bearings 305 around shaft 304. A ring gear 314 surrounds base 306 adjacent camlock linkage 302, and meshes with drive gear 312 driven by motor 310 mounted on camlock linkage 302. Motor 310 may be an electric or air gear motor controlled substantially as described above with regard to the various other motors in the present invention. A wing 316 is mounted to the side of base 306, and an arm mount 322 is mounted substantially on the rotational axis of base 306.

Forearm 324 is pivotably mounted to arm mount 322 at pivot 328. Angle cylinder 330 is mounted to forearm 324 at pivot 334, and rod 332 of cylinder 330 is mounted to wing 316 at pivot 326. Cylinder 330 may be provided with hydraulic power from valve 340 substantially as described above with respect to similar cylinders in the present invention. Thus, cylinder 330 may be utilized to alter the angle between forearm 324 and wing 316, regardless of the rotational position of base 306 caused by rotation of gears 312 and 314.

At an end of forearm 324 opposite pivot 328, forearm 324 defines a fixed jaw 350. Opposite fixed jaw 350, pivoting jaw 352 is pivotably coupled to forearm 324 at pivot 354. Cylinder 356 is coupled to pivoting jaw 352 at pivot 353, and rod 358 of cylinder 356 is coupled to fixed jaw 350 at pivot 351. Cylinder 356 may be supplied with hydraulic power through valve 342 substantially as described above with respect to other cylinders in the present invention. Thus, the angle of jaw 352 with respect to jaw 350, and the width of the space therebetween, may be altered by expansion of contraction of cylinder 356. In order to avoid binding feedline 344 and 346 supplying cylinders 330 and 356, respectively, a stop may be installed on gear 314 to prevent rotation of base 306 through an angle greater than 360 degrees.

The claw 300 may be utilized to carry a vacuum cleaning hose or other remotely-powered tool from the manhole to any point in the interior of the hemispheric shell. This is especially advantageous for removing milling debris and other waste products of repair operations.

Figure 5:
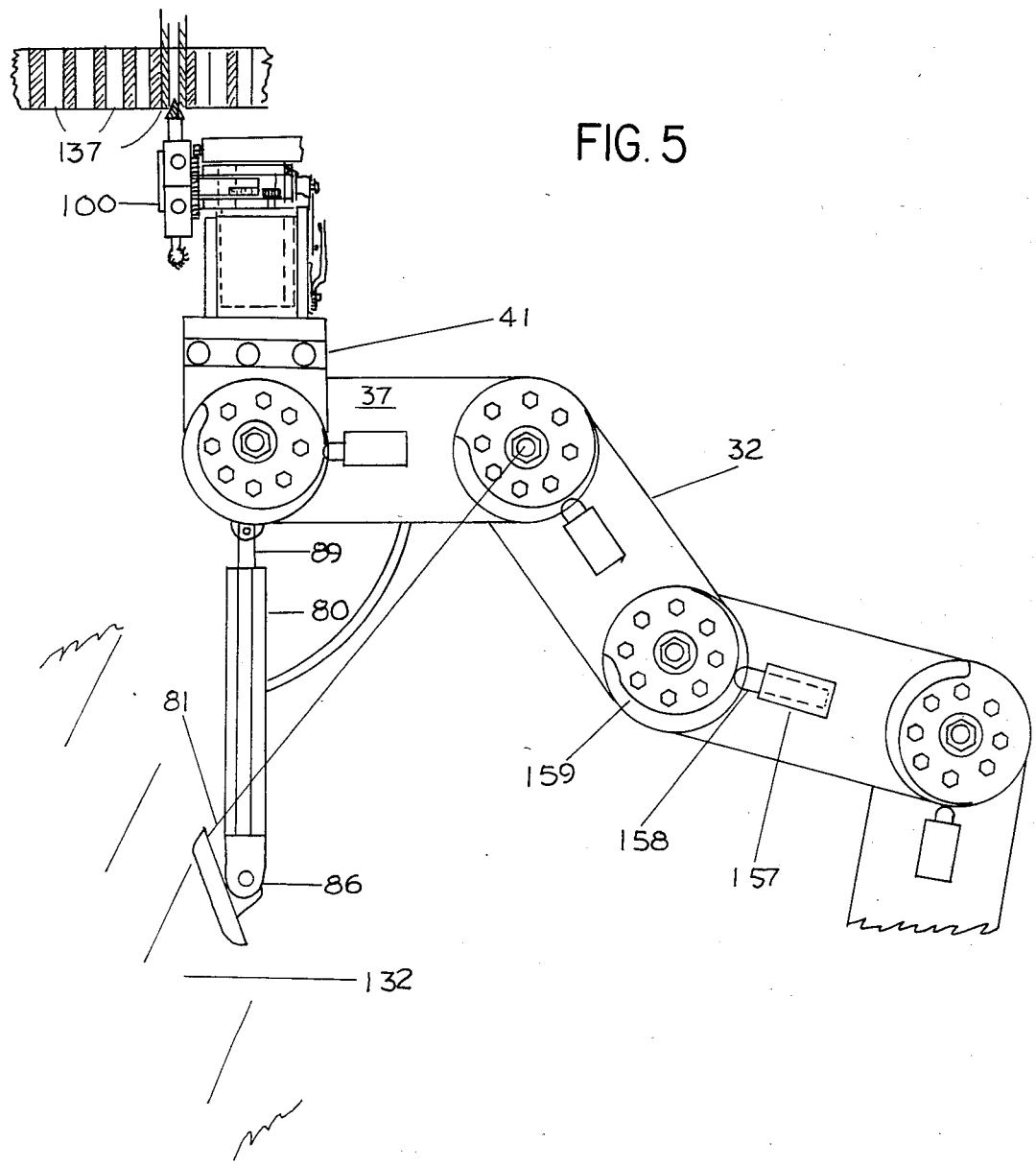
FIG. 5 is an isolated side view of a portion of the apparatus of FIG. 2 including a magnetic base for providing additional stability of the arm during repair operations.
Figure 10:
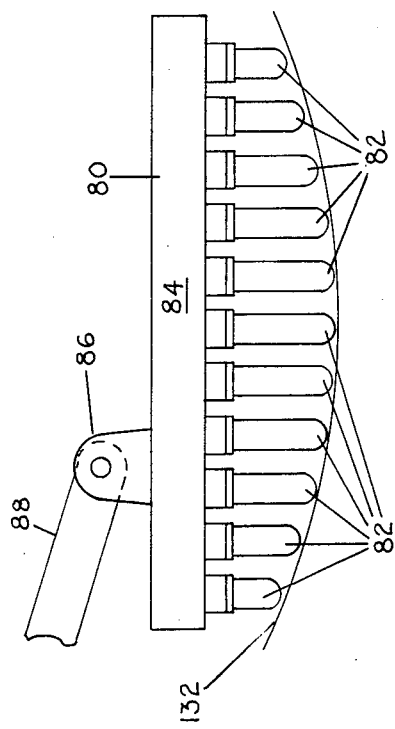
FIG. 10 is an isolated view of a portion of the apparatus of FIG. 5, showing the magnetic base thereof.

If it is desired to enhance the stability of arm 32, a magnetic base 80 as shown in FIGS. 5 and 10 may be added to the end thereof. The magnetic base 80 conforms to the interior surface shape of hemispheric shell 32, and can be attached to and detached thereto by electromagnets. The magnetic base 80 includes a base plate 84 from which depend a plurality of slideable electromagnetic pins 82. A cylinder 88 is pivotably coupled to base plate 84 at hinge 86. Cylinder 88 may be supplied with pressure through supply line 83 and controlled by valves as described above. Additionally, it may be desired to utilize one or more hoist lines 85 coupled to base plate 84 for lifting of the base 80. The hoist lines could be paid out and collected by, for instance, a motor mounted on the end of arm 32 (not shown) or alternatively by passage of line 85 through the arm 32 to a remote motor outside the hemispheric shell 132.

FIG. 4 shows an angle detection system for each arm segment 40. Each cylinder 157 is mounted to each 127 and coupled to a return hydraulic line 501. Each cam 159 is mounted or machined to each housing 128 surrounding elbow 46 and contacts an end of corresponding piston 158. As housing 128 is rotated, cam 519 will move piston 158. As shown on FIG. 18, each hydraulic line 501 allows fluid to pass through to a slave cylinder 451 which operates a piston 456 having a gear rack 455 machined to end of piston rod 456. The gear rack 455 turns a pinion gear 453 to drive gearing 459 which in turn rotates a dial 550 to display the angle within segment 40 between housing 127 and housing 128. A similar cylinder 157 and cam 159 are also located on segment 50 to report the angle of elbow 57 to a dial 450. A plurality of dials 550 as shown in FIG. 18 display the angle of each segment 40, angle of work head 100, and angle of segment 50.

Figure 17:
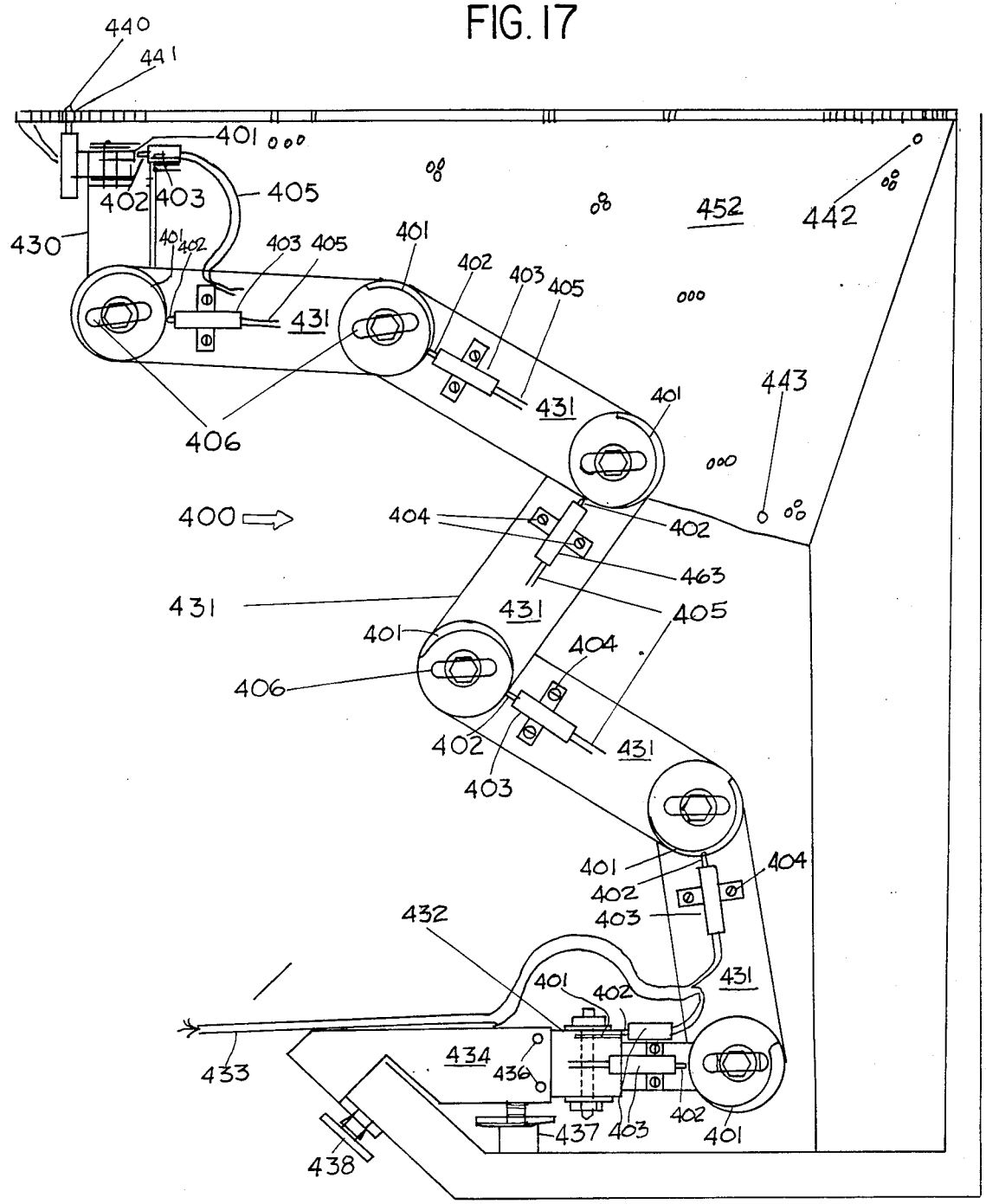
FIG. 17 is a side view of a model tubesheet and model arm used for comparison of arm placement.

Illustrated in FIG. 17 is a model 400 containing a model tubesheet 452, a model workhead 430 with a model arm 431 and model swing 432 mounted to model 434. The model arm 431 comprises a plurality of segments 437, each a scale model of a segment of arm 32. Each segment 437 bears a hydraulic cylinder 403 corresponding to cylinder 157, a cam 401 corresponding to cam 159, and a wingnut 406 to lock the segment 437 in place. Fluid is passed through a plurality of lines 405 coupled to cylinders 403 to operate a plurality of dials 450 shown in FIG. 18 as described above. Thus, the model arm 431 may be maneuvered to place mode workhead 430 directly beneath a model tube 441 of model tubesheet 452, and locked by wingnut 406 to illustrate on dials 450 the desired position of arm 32.

An operator can then proceed, with the visual assistance of closed circuit television, to move each segment 40 and workhead 100 to locate a tube 441 for model calibration purposes. If dials 550 are not the same as dials 450, then model head 430 can be lowered and manually moved to where each of dials 450 are the same as dials 550. At the bottom of model bracket 434 are two screwjacks or leveling jacks 437. One screwjack 437 is mounted on each side of model bracket 434. With the use of these screwjacks 437, model assembly 400 can be zeroed into line with tube 441. Model 400 is then moved to tube 442 and operator moves workhead 100 to tube 442; dials 450 and 550 are then checked and adjusted as aforesaid, then operator proceeds to tube 443; If all three (3) reference points read the same on dials 450 and 550, with the model tube sheet 432 containing the same arrangement of tubes as contained within generator 130 and model 400 is located in the same orientation, then the operator may easily locate any tube desired on which to perform work inside generator 130. Model 400 contains no gearing or motors, but each segment can be locked in position be wingnuts 406. It should be noted that model 400 and arm 32 are totally independent from each other and, once calibrated, model 400 could be left in containment building as a permanent fixture along with mounting bracket 30.

Figure 18:
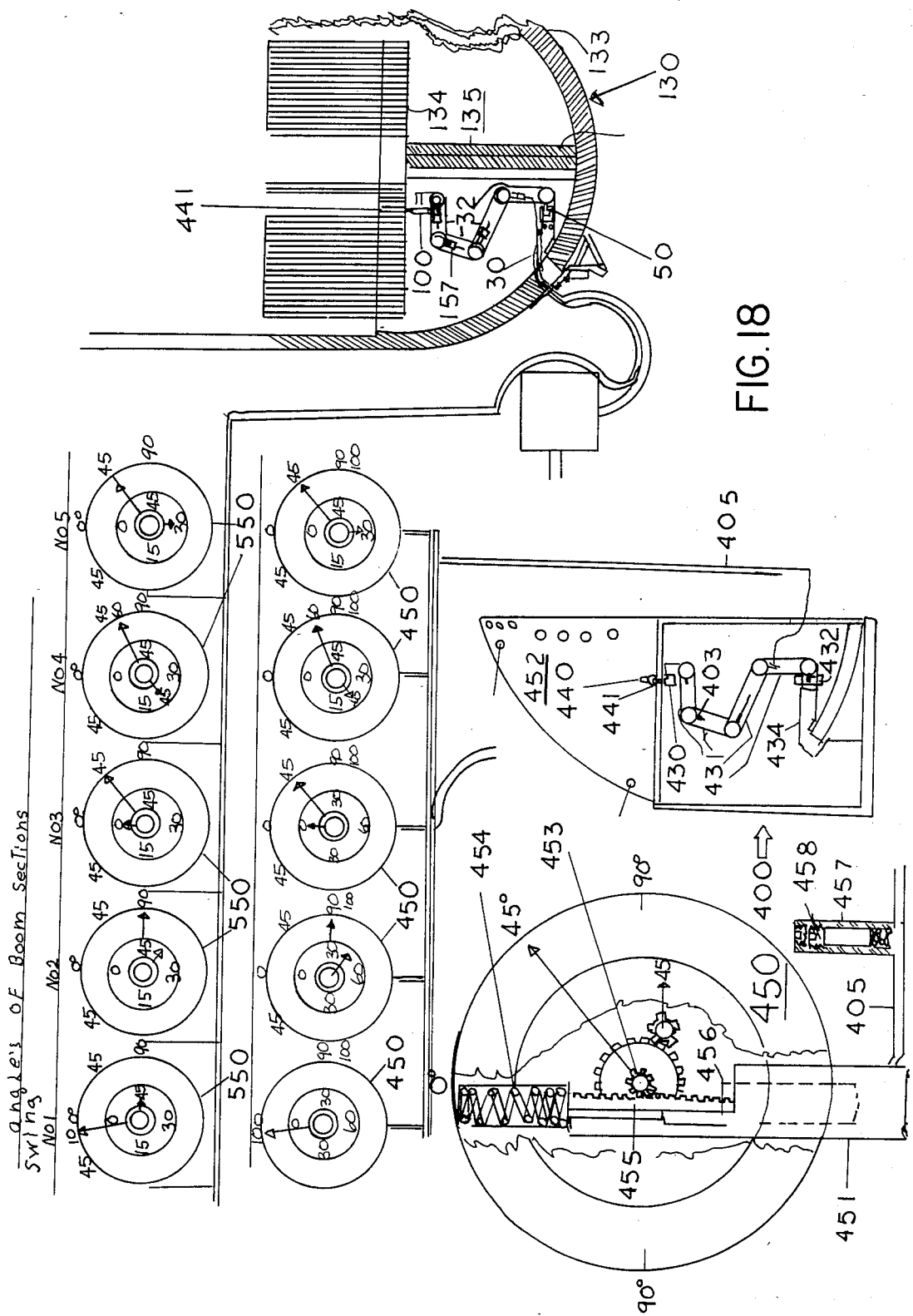
FIG. 18 is a schematic view of a fluid circuit utilized in conjunction with the model of FIG. 17 for controlled placement of the arm of FIG. 2.

FIG. 18 shows a cylinder 457 with an adjustment screw 458 that can be used to calibrate dials. If screws 458 is turned clockwise, piston in cylinder 457 will displace fluid and dial 450 will move to the right; if turned counterclockwise as aforesaid, dial 450 will move to the left.

These hydraulic cylinders should be bled free of air and calibrated with pistons in center of movement. Lines 405 and lines 501 should have no connections between cylinders 157 and 404 and slave cylinders 451. The cylinders 157 and 404 can be mounted to segments 40 and model segments 437 by screws 404 shown in FIG. 17. A spring 454 mounted at top of piston rack 455 operated by piston 456 will push fluid through line 405 and 501 to keep pistons 402 and 158 against cams 159 and 401.

In operation of the present invention, the nuclear generator is first prepared by shutdown of the core and evacuation of all coolant, followed by opening of the appropriate manhole in the hemispheric shell 132. The manhole bracket 30 is then installed through the manhole 133 so that internal bracket segment 38 rests on the inside of hemispheric shell 132 and the brace 66 rests on the exterior of shell 132. Bolts may be then inserted through bracket bolt sockets to mate with bolt sockets surrounding the manhole 133, and tightened to secure bracket 30 against shell 132. Appropriate electric, air and hydraulic lines are then coupled to bracket 30, and bracket jacks 72 are extended to establish a wide contact base on the interior of shell 132.

Arm segment 36 is then coupled to bracket camlock 64 in order to provide a fixed point of operation for arm 32 and deliver control signals, electrical, air and hydraulic power through camlock 64 to arm 32. Rod mount 67 is coupled to arm segment 36. As shown in FIG. 2, arm 32 and assistance cylinder 68 are then manipulated to deliver segment 50 through manhole 133. As shown in FIG. 3, the arm 32 is then manipulated to insert motor 52 and bracket pins 54 in mounting socket 78 of bracket segment 38. Hydraulic pressure on bracket pins 54 is then applied, to force pins 54 apart and through holes 76 to secure segment 50 in socket 78. Control signals, electrical, air and hydraulic power are now supplied to arm 32 through socket 78, and the arm 32 may be released from bracket camlock 64. Arm segment 36 is uncoupled from bracket camlock arm 32, and workhead segment 37 and workhead 100 are coupled to arm 32.

At this time the arm 32 may be withdrawn entirely into shell 132 as illustrated in FIG. 4, or it may be desired to attach accesories such as magnetic base 80 or mechanical claw 300 to the free end of arm 32. Such devices can then be drawn through manhole 133 to perform work inside hemispheric shell 132.

Removal of the arm 32 upon completion of necessary repairs may be accomplished by removal of the various components in substantially reverse order.

As described above, arm 32 and model arm 431 are initially calibrated. Model arm 431 may then be positioned by hand beneath a model tube corresponding to a tube on which work is required. The arm 32 is operated by directing appropriate control signals as described above through electric lines 49 to valves, regulators or limiters 39 through which air line 45 is coupled to each motor 48 and motor 52. Thus, the elbow gearing 90 of each arm segment 40 may be pivoted forward or backward by clockwise or counterclockwise operation of each motor 48. As torque is transferred through each axle 94 to pivot housing 128 against housing 127, their relative positions and, therefore, the orientation of the arm 32 may be determined by reference to dials 450. When each dial 550 matches the corresponding dial 450, then the arm 32 is known to be in the same orientation as model arm 431.

When workhead 100 has been attached to arm 32, and arm 32 has been manipulated to place workhead 100 beneath tube sheet 134, motor 105 is activated to rotate axle 106, thereby carrying turntable 110 around the periphery of workhead 100 until turntable 110 is positioned directly beneath a tube 136 to be worked on. Motor 111 is then activated to rotate platter 115 until a turret 116 bearing an appropriate tool has been positioned directly beneath the tube 136. A limit switch 140 is then selected corresponding to the tool and turret to be engaged, and telescope jack 104 is activated to raise housing 103 carrying turntable 110 above housing 102 until contact ends 145 of limit switch 140 make contact, at which time the tool is known to be at the appropriate location adjacent tube 136.

In order to rotate platter 115, piston 120 is activated to withdraw index pin 117 from hole 118. Since the speed of motor 111, the gear ratio of gears 112 and 113, and the separation of each turret 116 are all known, the duration of operation of motor 111 necessary to carry a desired tool into position above index pin 117 may be computed. When the desired tool is in position, piston 120 is withdrawn which allows pin 117 and motor 119 to be driven upward by spring 121 so that pin 117 passes through hole 118 to engage a tool mounted in turret 116 above hole 118. Simultaneously, self-sealing air, electrical and hydraulic linkages for each turret 116 are aligned with corresponding linkages in turntable 110 to supply power to the tool. Upon completion of the tool's activity, it may be disengaged from the tube 136 by operation of telescope jack 104 to lower housing 103 into housing 102. The process of turret rotation and telescope jack operation to engage and disengage tools may be repeated as appropriate. Arm 32 may also be manipulated to place workhead 100 through manhole 133 for replacement of tools, resupply of working materials or replacement or workhead 100 with a claw or other devices.

The weld head 210, when mounted in a turret 116, is raised to tube 136 until weld tip 240 meets the junction between tube 136 and tube sheet 134. The vicinity of tip 240 is then flooded with an inert gas such as argon through gas line 248 and bore 223. Welding current is then supplied through terminal 234, spring 236, brush 238, contact tube 230 and collet 242 to the tip 240. After a time sufficient to establish an arc between the tip 240 and the junction of tube sheet 134 and tube 136, motor 214 is activated to rotate shaft 221 and a contact tube 230 which carries collet 242 and tip 240 in a circle to complete a circumferential weld. Shaft 221 may be rotated may be rotated one or more times as appropriate. Current may be disconnected from tip 240 prior to completion of rotation in order to separate tip 240 from a weld puddle and break the arc. Cams 229 may be utilized to make and break circuits with contact tube 230, thereby indicating the relative position of tip 240 for purposes of arc initiation and elimination.

Thus, it can be appreciated that there has been disclosed a remote manipulator arm for conducting repairs quickly and efficiently within a nuclear generator shell, which offers distinct advantages including mobility and versatility over the prior art. It should be apparent that while there has been described what is presently considered to be a presently preferred from of the present invention, changes may be made in the disclosed apparatus without departing from the true spirit and scope of the invention as defined in the following claims.

What is claim is:

1. An apparatus for remote repair of tubes within a nuclear generator, comprising in combination: a bracket mounted to said generator, an arm mounted to said bracket, and a workhead mounted to said arm, said arm comprising a plurality of linkable arm segments, each said arm segment comprising a rotatable arm housing, an air motor held within said housing, an elbow within said housing coupled to said motor and adapted to rotate said arm housing, a plurality of control and power conduits within said arm housing, and releaseable camlock linkage means mounted to each end of said housing and adapted to couple adjacent arm segments to one another, said workhead comprising a workhead housing, telescope means within said workhead housing adapted to telescope said workhead housing along a first axis, a turret rotatably mounted on said workhead housing, a plurality of tools for tube repair radially mounted to said turret, a tool motor mounted in said turret and adapted to selectively drive any one of said tools, rotation means mounted on said workhead housing adapted to rotate said turret on a second axis perpendicular to said first axis, and swing means mounted within said workhead housing adapted to carry said turret around said first axis.

2. Apparatus as claimed in claim 1 wherein each said arm segment further comprises valve means coupled to said air motor for control of said air motor, said valve means being coupled to electrical transfer means.

3. Apparatus as claimed in claim 1 wherein said elbow further comprises planetary gear means and rigid spline means coupled to said motor means and adapted to pivotably rotate said elbow.

4. Apparatus as claimed in claim 1 wherein said workhead housing further comprises a plurality of limit switch means, each said limit switch means being adapted to limit said telescope means for precise positioning of said tools against said tubes.

5. Apparatus as claimed in claim 1 wherein said nuclear generator comprises a manhole, and wherein said bracket is adapted to extend through and releaseably join to said manhole.

6. Apparatus as claimed in claim 5 wherein said bracket further comprises interior arm linkage means fixed to said shell inside aid generator and exterior arm linkage means fixed to said shell outside said generator, said interior and exterior linkage means being adapted to releaseably join to said linkage means of each said arm segment of said arm.

7. Apparatus as claimed in claim 1 wherein said tools include a reamer.

8. Apparatus as claimed in claim 1 wherein said tools include a plug inserter.

9. Apparatus as claimed in claim 1 wherein said tools include a tube roller.

10. Apparatus as claimed in claim 1 wherein said tools include a wire brush.

11. Apparatus as claimed in claim 1 wherein said tools include a plug puller.

12. Apparatus as claimed in claim 1 wherein said tools include a welding head.

13. An apparatus for remote repair of coolant circulation tubes within a nuclear generator of the type including a tube sheet above a hemispheric shell, comprising in combination: a bracket adapted to be mounted to said hemispheric shell, an arm adapted to be fixedly mounted to said bracket, and workhead adapted to be removeably mounted to said arm, said arm comprising a plurality of arm segments, each said arm segment comprising a motor housing, an air motor held within said motor housing, an outer housing pivotably coupled to said motor housing and adapted to be driven in rotation about said motor housing by said motor, and releaseable linkage means mounted to opposite ends of said motor housing and said outer housing, said workhead comprising a workhead housing, tool selection means mounted to said workhead housing, a plurality of tools for tube repair mounted to said tool selection means, a tool motor mounted in said tool selection means and adapted to selectively engage and drive said tools, and housing positioning means mounted to said workhead housing and adapted to position said tools relative to said tube sheet.

14. Apparatus as claimed in claim 13 wherein said arm segment further comprises angle sensor means adapted to detect an angle formed between said motor housing and said outer housing .

15. Apparatus as claimed in claim 13 wherein each said arm segment further comprises air transfer means, valve means and electrical transfer means, said air transfer means being coupled through said valve means to said air motor, said valve means being coupled to said electrical transfer means and being adapted to be remotely operated by way of said electrical transfer means.

16. Apparatus as claimed in claim 15 further comprising electromagnetic base means coupled to said arm adjacent said workhead and adapted to contact and releaseably maintain position against the interior of said hemispheric shell of said generator.

17. An apparatus for remote repair of tubes within a nuclear generator, comprising in combination: a bracket mounted to said generator, an arm mounted to said bracket and a workhead mounted to said arm, said arm comprising a plurality of linkable arm segments, each said arm segment comprising an arm housing, an air motor held within said housing, an elbow defined in said arm housing, planetary gear means and rigid spline means adapted to rotate said arm housing at said elbow, said gear means being coupled to said motor, air line means, hydraulic line means and a plurality of electric line means within said housing, valve means, said air line means being coupled through said valve means to said motor, one of said electric line means being coupled to said valve means, and camlock means mounted to each end of said housing and adapted to couple adjacent arm segments, said workhead comprising a workhead camlock means, outer housing means mounted to said workhead camlock means, inner housing means slideably mounted to said outer housing means, telescope jack means mounted to said inner and outer housing means adapted to raise and lower said inner housing means with respect to said outer housing means, a turret rotatably mounted to said inner housing means, swing motor means mounted to siad inner housing means adapted to rotate said turret about said inner housing means, said turret comprising a base fixedly mounted to said inner housing means and a platter rotatably mounted to said base, turret motor means mounted to said inner housing means adapted to rotate said platter, about said base, said platter defining a plurality of sockets adapted to carry and operate repair tools, said turret motor means, swing motor means, and telescope jack means being coupled to said line means through said workhead camlock means, tool motor means mounted to said base and adapted to drive a selected tool among repair tools mounted to said sockets, and a plurality of limit switch means each corresponding to one of said sockets and mounted to said inner and outer housing means, said limit switch means being adapted to limit said telescope jack means so as to position said selected tool in said corresponding socket precisely against said tubes in said nuclear generator.

18. Apparatus as claimed in claim 17 wherein said repair tools include a claw adapted to install a porthole dam.

* * * * *